United States Patent [19]

Ahlgren et al.

[11] 4,020,693
[45] May 3, 1977

[54] ACOUSTIC TRANSDUCER FOR NUCLEAR REACTOR MONITORING

[75] Inventors: Frederic F. Ahlgren, Alplaus; Paul F. Scott, Schenectady, both of N.Y.

[73] Assignee: The United States of America as represented by the United States Energy Research and Development Administration, Washington, D.C.

[22] Filed: Apr. 12, 1976

[21] Appl. No.: 675,843

[52] U.S. Cl. .............................. 73/339 A; 73/349; 73/363.9; 116/137 R; 137/829; 176/19 R
[51] Int. Cl.² ................ G01K 11/26; G01K 13/02; G21C 17/02
[58] Field of Search ............ 73/290 B, 339 A, 349, 73/357, 363.9, 419, 552; 116/137 R; 137/828, 829, 842; 176/19 R

[56] References Cited

UNITED STATES PATENTS

| 1,315,019 | 9/1919  | Heyer ............................. 116/137 |
| 3,403,509 | 10/1968 | Eastman et al. ................ 73/357 X |
| 3,517,559 | 6/1970  | Blazek ........................... 137/842 X |
| 3,557,816 | 1/1971  | Small ............................. 137/829 X |

OTHER PUBLICATIONS

Barnes, J. H.; "Measurement of Gas Temperature Using Gas Jet Generator"; Proc. Instn. Mech. Engrs. (1969-1970); vol. 184, p. 1, No. 6; pp. 107-116.

Primary Examiner—Richard C. Queisser
Assistant Examiner—John S. Appleman
Attorney, Agent, or Firm—Dean E. Carlson; Roger S. Gaither; L. E. Carnahan

[57] ABSTRACT

A transducer to monitor a parameter and produce an acoustic signal from which the monitored parameter can be recovered. The transducer comprises a modified Galton whistle which emits a narrow band acoustic signal having a frequency dependent upon the parameter being monitored, such as the temperature of the cooling media of a nuclear reactor. Multiple locations within a reactor are monitored simultaneously by a remote acoustic receiver by providing a plurality of transducers each designed so that the acoustic signal it emits has a frequency distinct from the frequencies of signals emitted by the other transducers, whereby each signal can be unambiguously related to a particular transducer.

8 Claims, 1 Drawing Figure

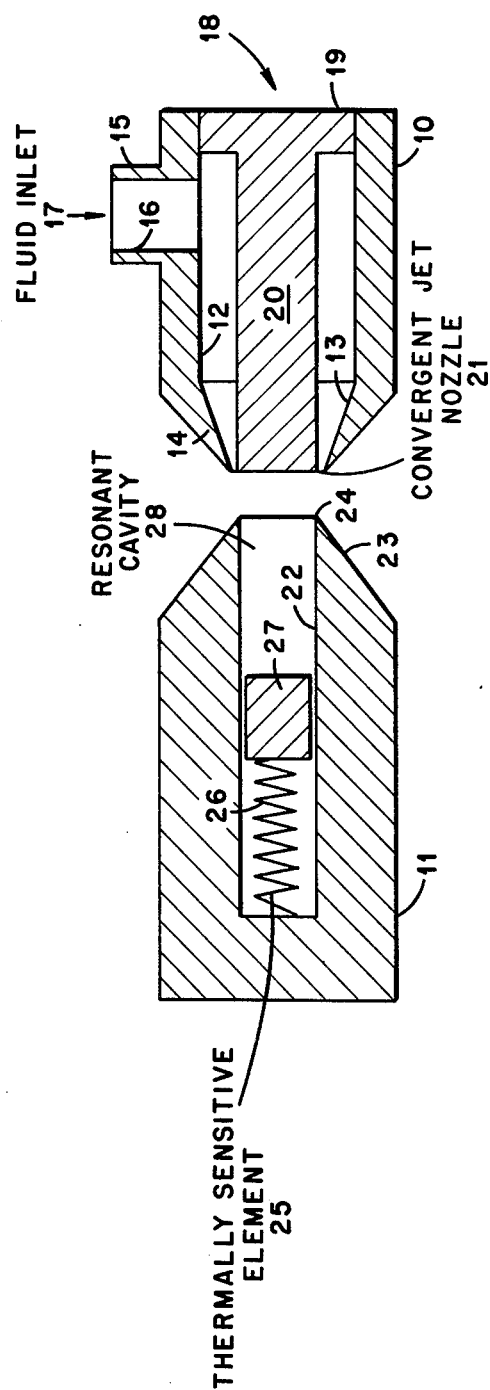

ACOUSTIC TRANSDUCER FOR NUCLEAR REACTOR MONITORING

BACKGROUND OF THE INVENTION

The invention described herein was made in the course of, or under Contract No. AT(04-3)-893, Task 9, with the United States Energy Research and Development Administration.

The invention relates to acoustic transducers, particularly to acoustic transducers for nuclear reactor monitoring, and more particularly to acoustic transducers for monitoring selected parameters such as the temperature of the coolant in a nuclear reactor.

Various types of devices or transducers for monitoring the pressure and/or temperature of the coolant in a nuclear reactor are known in the prior art as exemplified by U.S. Pats. Nos. 3,296,864 issued Jan. 10, 1967 to W. A. Kealy et al, and 3,350,271 issued Oct. 31, 1967 to L. Maidment et al, and Belgian Pat. No. 638,683 issued Apr. 15, 1964. In addition, U.S. Pat. No. 3,451,269 issued June 24, 1969 to J. L. Johnson exemplifies prior known temperature sensors which produce oscillating acoustic signals having a frequency which is the function of the temperature of fluid passing through the sensor, the frequency varying due to changes in the characteristics of the fluid with changes in temperature.

Use of these prior known devices or transducers requires containment vessel penetration for electrical, pressure, or fluid leads and operating experience has shown that vessel penetration is a chronic source of system failure and reduction of vessel penetrations is of great interest in reactor design and operation. A need exists in the art for nuclear reactor monitoring devices which do not require or minimize vessel penetrations and thus eliminate or materially reduce the problems associated with such penetrations.

SUMMARY OF THE INVENTION

The present invention fills the need existing in the prior art by providing a nuclear reactor monitoring means which would monitor the desired quantity or parameter and transmit this information as an acoustic signal to a remote receiver which can be on the outside of the reactor vessel. As a coolant temperature monitor the transducers of this invention preferably use the fluid coolant as a source of power, and function as a fluidic whistle which produces a narrow band sound whose frequency varies with temperature change which causes changes in the geometry of the acoustic transducer. However, the drive fluid passing through the whistle need not be the fluid coolant whose temperature is sensed. The acoustic transducer is provided, for example, with a temperature sensitive element which varies the length of the resonant cavity and therefor the resonant frequency of the cavity.

Therefore, it is an object of this invention to provide an acoustic transducer.

A further object of the invention is to provide a temperature responsive acoustic transducer which comprises a modified Galton whistle. Another object of the invention is to provide a nuclear reactor coolant temperature monitoring means involving an acoustic transducer located within the coolant flow which produces acoustic signals responsive to the temperature of the coolant.

Another object of the invention is to provide an acoustic transducer having a resonant cavity which changes geometrically responsive to temperature change of coolant fluid flow serving as the power source thus changing the resonant frequency of the cavity.

Another object of the invention is to provide an acoustic transducer for nuclear reactor monitoring of coolant temperature which emits a narrow band acoustic signal having a frequency dependent upon temperature.

Other objects of the invention will become readily apparent from the following description and accompanying drawing.

BRIEF DESCRIPTION OF THE DRAWING

The single FIGURE illustrates in cross-section an embodiment of the acoustic transducer of the invention.

DESCRIPTION OF THE INVENTION

The invention is directed to a transducer for measuring the temperature inside a fluid-filled vessel, preferably a nuclear reactor, and for transmitting temperature information to the outside of the vessel as an acoustic signal. The transducer comprises a modified Galton whistle which emits a narrow band acoustic signal having a frequency dependent upon temperature. The modified Galton whistle includes a resonant cavity having dimensions which determine the frequency of the acoustic signal. A temperature sensitive element varies the length and therefore resonant frequency of the resonant cavity. A coolant flow stream or other fluid stream in the reactor provides a power source for the transducer. The drive fluid passing through the whislte need not be the fluid coolant whose temperature is sensed. For example, the coolant may not have a high enough velocity to operate the whistle. The drive fluid then has only a small volume and the whistle is responsive to the surrounding local temperature.

Multiple locations within the reactor can be monitored simultaneously by providing a plurality of transducers each designed so that the acoustic signal it emits has a frequency distinct from frequencies of signals emitted by all other transducers. The frequency of the signal emitted by each transducer is within an exclusive band of frequencies so that each signal can be unambiguously related to a particular transducer.

The acoustic transducer provides: (1) an inherently reliable method of monitoring operating parameters in a reactor without vessel penetrations, (2) a monitoring method which is compatible with a variety of reactor system designs, and (3) a method by which multiple locations can be monitored simultaneously.

Broadly, the invention is a device to monitor a parameter and produce an acoustic signal from which the monitored parameter can be recovered. To provide for the monitoring of multiple locations the device must produce a narrow band acoustic signal so that it can be frequency multiplexed with other similar devices.

The embodiment of the invention illustrated in the drawing comprises a modified Galton whistle composed of a pair of housings or body members 10 and 11 axially aligned with and spaced from one another.

Housing 10 is provided with a central longitudinally extending annular opening or passage 12 having a converging or tapering reduce diameter end section 13 formed within an inwardly tapering portion 14 of the housing, and has a flange or collar portion 15 having an opening 16 extending therethrough and in fluid communication with annular opening 12 forming a fluid or coolant inlet as indicated at 17. A T-shaped member generally indicated at 18 is positioned in annular opening 12 with an arm secton 19 thereof secured therein to form a seal or end plate at the end of annular opening 12 opposite the tapered end section 13 such that a stem or leg section 20 of T-shaped member 18 is positioned within the tapered end section 13 and cooperates with inwardly tapering housing portion 14 to define an annular nozzle indicated at 21, which in this embodiment is shown as being of a converging configuration, although a nozzle having parallel walls at the tip may be utilized.

Housing 11 is provided with a centrally located cylindrical cavity or chamber 22 and a tapering outer end surface 23 forming a circular sharp edge 24. Positioned within cavity 22 is a thermally sensitive element generally indicated at 25 composed of a spring or resilient member 26 secured to a plug or member 27. Annular cavity 22 is approximately the same diameter as stem section 20 of T-shaped member 18 in housing 10 and thus smaller in cross section than convergent jet nozzle 21, and forms a resonant cavity section 28 of cavity 22.

It is thus seen that housings 10 and 11 and the components thereof form: (1) an annular nozzle 21 which produces a thin jet impingent on a circular sharp edge, and (2) a mechanical oscillator or transducer which is excited by the jet whose operating frequency is temperature dependent, such as resonant cavity 28 whose length is temperature sensitive as determined by element 25.

In operation, fluid, such as liquid sodium reactor coolant, enters housing 10 via fluid inlet 17, chamber 12 and exits through nozzle 21 forming a fluid jet which excites the cavity section 28 to vibrate at its resonant frequency which in turn is dependent on the local temperature in that temperature changes activate thermally sensitive element 25 to increase or decrease the length of the resonant cavity section 28. This vibration produces an acoustic signal which can be monitored by a receiver on the outside of the reactor vessel. The detected signal is then narrow band filtered to extract the output of the particular acoustic transducer and the characteristic frequency determined to obtain the temperature information.

Accordingly, the invention provides a narrow band fluidic whistle for monitoring reactor coolant temperature. A modified Galton whistle, made in accordance with the invention, having a jet nozzle diameter of about 3 mm, with a resonant cavity of a diameter of 3 mm and length of 11 mm, produced a stable narrow band tone centered at approximately 146 KHz.

It is readily seen that by design of the nozzle and resonant cavity signals of different frequencies can be produced such that the coolant temperature in various portions of the reactor can be monitored simultaneously by each acoustic transducer, located in different portions of the reactor, producing an exclusive band of frequencies so that each signal can be unambiguously related to a particular transducer.

While the remote acoustic signal receiver located out of the vessel does not constitute part of this invention, since such receivers are known in the art, a detailed description thereof is deemed unnecessary, but may, for example, be broadly described as follows:

An accelerometer mounted outside the reactor wall receives the acoustic vibrations from the whistles via the reactor coolant or an acoustic waveguide. The transducer converts these vibrations to electrical fluctuations which are than analyzed by a frequency modulation (FM) receiver, frequency lock loop or spectrum analyzer to obtain the instantaneous frequency of a selected whistle. This frequency value is then converted to a temperature value which comprises the measurement.

Therefore, the present invention provides a simple, yet effective means of monitoring temperature within a closed vessel, such as a nuclear reactor, without penetration of the vessel, thereby substantially advancing the state of the art.

The acoustic transducer has been described in a configuration to monitor temperature. Other parameters such as pressure, flow rate, or vibration could also be monitored with suitable acoustic transducers.

By way of example, a configuration for monitoring vibration could be accomplished by replacing the temperature responsive member with a vibration responsive rod, such that as the surface vibrates, the rod moves with vibration and changes the cavity configuration.

Also, while the whistle has been described for use with a remote receiver, an alternate receiver can be used, such as a single hydrophone (microphone) inside the reactor vessel with only one wire to the outside for multiple whistles.

While a particular embodiment of the invention has been illustrated and described, modifications will become apparent to those skilled in the art, and it is intended to cover in the appended claims all such modifications as come within the spirit and scope of the invention.

What we claim is:

1. An acoustic transducer for use with a remote receiver for monitoring a selected parameter composed of the temperature of a fluid flowing therethrough comprising: means defining an annular nozzle for producing a jet of fluid passing therethrough, means for supplying fluid to said nozzle, means defining a resonant cavity positioned in alignment with said annular nozzle, and means responsive to the selected parameter for varying geometry of said resonant cavity, whereby fluid passing through said nozzle impinges on said resonant cavity forming means creating an acoustic signal having a frequency responsive to the selected parameter being monitored.

2. The acoustic transducer defined in claim 1, wherein said annular nozzle defining means comprises a housing having an annular passage extending therethrough, said annular passage having an inwardly tapering end section, said housing having a tapered outer end surface which abuts with said inwardly tapering end section of said annular passage, and means positioned at least in said tapering end section of said passage forming therewith said annular nozzle.

3. The acoustic transducer defined in claim 2, wherein said means positioned at least in said tapering end section of said passage comprises a T-shaped member having one end thereof positioned in said tapering end section and the opposite end of said T-shaped member positioned in the opposite end of said passage for functioning as a fluid seal; and wherein said means for supplying fluid comprises an opening in said housing defining a fluid inlet for providing fluid communication between said passage and an associated source of fluid, said opening being located adjacent said opposite end of said passage.

4. The acoustic transducer defined in claim 2, wherein said resonant cavity defining means comprises a second housing positioned in spaced relation with said first mentioned housing and having a cavity therein, said cavity being positioned in axial alignment with said passage of said first mentioned housing, said second housing having a tapering end section terminating at said cavity to define a circular sharp edge, said parameter responsive means being located in said cavity.

5. The acoustic transducer defined in claim 4, wherein said parameter responsive means comprises temperature responsive assembly composed of a thermally sensitive element secured to a plug movably positioned in said cavity for changing the geometry of said resonant cavity by varying the distance in said cavity between said circular sharp edge and said plug.

6. The acoustic transducer defined in claim 5, wherein said thermally sensitive element comprises a coiled member positioned between a closed end of said cavity and said movable plug.

7. The acoustic transducer defined in claim 1, wherein said annular nozzle is of a converging configuration.

8. The acoustic transducer defined in claim 1, wherein said fluid is liquid sodium.

* * * * *